US009654398B2

United States Patent
Kabakura

(10) Patent No.: US 9,654,398 B2
(45) Date of Patent: May 16, 2017

(54) COMPUTER SYSTEM, CONTROLLER, SWITCH, COMMUNICATION METHOD AND RECORDING MEDIUM STORING A NETWORK MANAGEMENT PROGRAM

(71) Applicant: NEC CORPORATION, Tokyo (JP)

(72) Inventor: Masanori Kabakura, Tokyo (JP)

(73) Assignee: NEC Corporation, Tokyo (JP)

( * ) Notice: Subject to any disclaimer, the term of this patent is extended or adjusted under 35 U.S.C. 154(b) by 27 days.

(21) Appl. No.: 14/371,425

(22) PCT Filed: Jan. 8, 2013

(86) PCT No.: PCT/JP2013/050118
§ 371 (c)(1),
(2) Date: Jul. 9, 2014

(87) PCT Pub. No.: WO2013/105551
PCT Pub. Date: Jul. 18, 2013

(65) Prior Publication Data
US 2014/0328179 A1   Nov. 6, 2014

(30) Foreign Application Priority Data
Jan. 11, 2012 (JP) ................................ 2012-003551

(51) Int. Cl.
*H04L 12/801* (2013.01)
*H04L 29/06* (2006.01)
(Continued)

(52) U.S. Cl.
CPC .......... *H04L 47/10* (2013.01); *H04L 43/0888* (2013.01); *H04L 45/38* (2013.01);
(Continued)

(58) Field of Classification Search
CPC ................................ H04L 45/38; H04L 47/10
See application file for complete search history.

(56) References Cited

U.S. PATENT DOCUMENTS

| 2004/0100953 A1 | 5/2004 | Chen et al. |
| 2004/0184483 A1 | 9/2004 | Okamura et al. |

(Continued)

FOREIGN PATENT DOCUMENTS

| CN | 1322722 C | 6/2007 |
| CN | 100473042 C | 3/2009 |

(Continued)

OTHER PUBLICATIONS

English Translation of International Preliminary Report on Patentability in PCT No. PCT/JP2013/050118 dated Jul. 15, 2014.

(Continued)

Primary Examiner — Chi H Pham
Assistant Examiner — Kevin Lee
(74) Attorney, Agent, or Firm — McGinn IP Law Group, PLLC

(57) ABSTRACT

A computer system according to the present invention includes: a switch which transfers test data to a different switch via each of a plurality of networks to obtain a transfer performance of each of the plurality of networks; and a controller which configures a flow entry onto a flow table of the switch, the flow entry defining a network with a transfer performance equal to or higher than a threshold value as a transfer route to the different switch. This achieves load balancing in the computer system by using the OpenFlow technology.

4 Claims, 18 Drawing Sheets

(51) Int. Cl.
  *H04L 12/26* (2006.01)
  *H04L 12/715* (2013.01)
  *H04L 12/721* (2013.01)
  *H04L 12/717* (2013.01)
  *H04L 12/803* (2013.01)

(52) U.S. Cl.
  CPC .............. *H04L 45/42* (2013.01); *H04L 45/64* (2013.01); *H04L 45/70* (2013.01); *H04L 47/125* (2013.01); *H04L 69/14* (2013.01); *H04L 69/18* (2013.01)

(56) References Cited

U.S. PATENT DOCUMENTS

| | | | |
|---|---|---|---|
| 2006/0039335 A1 | 2/2006 | Ono et al. | |
| 2011/0032833 A1* | 2/2011 | Zhang | H04L 45/70 370/252 |

FOREIGN PATENT DOCUMENTS

| | | |
|---|---|---|
| JP | 2000-348005 A | 12/2000 |
| JP | 2002-064536 A | 2/2002 |
| JP | 2004-236198 A | 8/2004 |
| JP | 2006-060579 A | 3/2006 |
| JP | 2006-514793 A | 5/2006 |
| JP | 2007-189615 A | 7/2007 |
| JP | 2007-287064 A | 11/2007 |
| WO | WO 2004/034653 A1 | 4/2004 |

OTHER PUBLICATIONS

International Search Report in PCT/JP2013/050118 dated Mar. 5, 2013 (English Translation Thereof).

Seok Hong Min et al., "Implementation of a Programmable Service Composition Network using NetFPGA-based OpenFlow Switches," 1st Asia NetFPGA Developers Workshop, Jun. 2010, [retrieved on Feb. 21, 2013], Retrieved from the Internet: <URL: http://fif.kr/AsiaNetFPGAws/paper /1-1.pdf>.

OpenFlow Switch Specification Version 1.0.0 (Wire Protocol 0x01) Dec. 31, 2009.

Extended European Search Report dated Jun. 18, 2015.

Chinese Office Action dated Mar. 7, 2016 with an English translation thereof.

Japanese Office Action dated Jul. 14, 2015 with a partial English translation thereof.

* cited by examiner

| SOURCE SWITCH IDENTIFIER (121) | DESTINATION SWITCH IDENTIFIER (122) | NETWORK IDENTIFIER (123) | TRANSFER RATE (124) |
|---|---|---|---|
| SWITCH x | SWITCH y | NETWORK 1 | 0 |
| SWITCH x | SWITCH y | NETWORK 2 | 0 |
| SWITCH x | SWITCH y | NETWORK 3 | 0 |
| SWITCH x | SWITCH y | NETWORK 4 | 0 |
| SWITCH y | SWITCH x | NETWORK 1 | 0 |
| SWITCH y | SWITCH x | NETWORK 2 | 0 |
| SWITCH y | SWITCH x | NETWORK 3 | 0 |
| SWITCH y | SWITCH x | NETWORK 4 | 0 |

| DESTINATION SWITCH IDENTIFIER (221) | NETWORK IDENTIFIER (222) | TRANSFER CAPACITY (223) | TRANSFER TIME (224) |
|---|---|---|---|
| SWITCH y | NETWORK 1 | 0 | 0 |
| SWITCH y | NETWORK 2 | 0 | 0 |
| SWITCH y | NETWORK 3 | 0 | 0 |
| SWITCH y | NETWORK 4 | 0 | 0 |

| DESTINATION SWITCH IDENTIFIER | NETWORK IDENTIFIER | TRANSFER CAPACITY | TRANSFER TIME |
|---|---|---|---|
| SWITCH y | NETWORK 1 | 2000MB | 2000ms |
| SWITCH y | NETWORK 2 | 1600MB | 2000ms |
| SWITCH y | NETWORK 3 | 300MB | 1000ms |
| SWITCH y | NETWORK 4 | 200MB | 1000ms |

| SOURCE SWITCH IDENTIFIER (121) | DESTINATION SWITCH IDENTIFIER (122) | NETWORK IDENTIFIER (123) | TRANSFER RATE (124) |
|---|---|---|---|
| SWITCH x | SWITCH y | NETWORK 1 | 1000MB/sec |
| SWITCH x | SWITCH y | NETWORK 2 | 800MB/sec |
| SWITCH x | SWITCH y | NETWORK 3 | 300MB/sec |
| SWITCH x | SWITCH y | NETWORK 4 | 200MB/sec |
| SWITCH y | SWITCH x | NETWORK 1 | 500MB/sec |
| SWITCH y | SWITCH x | NETWORK 2 | 450MB/sec |
| SWITCH y | SWITCH x | NETWORK 3 | 250MB/sec |
| SWITCH y | SWITCH x | NETWORK 4 | 150MB/sec |

| 231 | 232 | 233 |
|---|---|---|
| TEST CYCLE PERIOD | ALLOWED MAXIMUM NETWORK NUMBER | TRANSFER THRESHOLD |
| 30sec | 2 | 60% |

Fig. 18

| 121 | 122 | 123 | 124 |
|---|---|---|---|
| SOURCE SWITCH IDENTIFIER | DESTINATION SWITCH IDENTIFIER | NETWORK IDENTIFIER | TRANSFER RATE |
| SWITCH x | SWITCH y | NETWORK 1 | 1000MB/sec |
| SWITCH x | SWITCH y | NETWORK 2 | 800MB/sec |
| SWITCH x | SWITCH y | NETWORK 3 | 300MB/sec |
| SWITCH x | SWITCH y | NETWORK 4 | 200MB/sec |

Fig. 20

```
                                    130
131 ─┬─ SOURCE SWITCH IDENTIFIER    │  SWITCH x
132 ─┼─ DESTINATION SWITCH IDENTIFIER │ SWITCH y
133 ─┴─ NETWORK IDENTIFIER LIST     │ (NETWORK 1, NETWORK 2)
```

| | 130 |
|---|---|
| 131 — SOURCE SWITCH IDENTIFIER | SWITCH x |
| 132 — DESTINATION SWITCH IDENTIFIER | SWITCH y |
| 133 — NETWORK IDENTIFIER LIST | (NETWORK 1, NETWORK 2) |

Fig. 21

| | 242 |
|---|---|
| 243 — DESTINATION SWITCH IDENTIFIER | SWITCH Y |
| 244 — NETWORK IDENTIFIER LIST | NETWORK 1, NETWORK 2 |

COMPUTER SYSTEM, CONTROLLER, SWITCH, COMMUNICATION METHOD AND RECORDING MEDIUM STORING A NETWORK MANAGEMENT PROGRAM

TECHNICAL FIELD

The present invention relates to a computer system and a communication method, more particularly, to a computer system which uses an OpenFlow technology and a communication method of the same.

BACKGROUND ART

A computer system with redundancy based on multiple networks achieves a high availability as such computer system can be operated by using an alternative network when a failure occurs. Also, such computer system can achieve load balancing and thereby offer a high speed communication in a normal operation by selecting networks actually used for the communications from multiple networks.

In order to provide efficient communications in a system, it is necessary to use networks with high performances as preferentially as possible. For instance, it is possible to improve the communication efficiency by selecting routes to be used on the basis of performance information of communication lines.

A system which selects routes to be used on the basis of performance information is disclosed, for example, in Japanese Patent Application Publication No. 2007-189615, (see patent literature 1). The system disclosed in patent literature 1 configures efficient communication routes by calculating routes on the basis of the network load.

A network monitoring assistance apparatus disclosed in patent literature 1 detects a failure by monitoring network appliances and analyses the affected range of the failure to calculate communication routes which bypass the affected range. In this operation, the network monitoring assistance apparatus calculates the routes on the basis of the utilization status of the traffic and the network load, including CPU utilization ratios and the like.

The system disclosed in patent literature 1 configures routes to be used on the basis of the utilization status of the traffic so that the communication routes bypass the affected range of the failure. Accordingly, the system can select a route with a low traffic utilization ratio, bypassing the failure. A route which is currently out of operation may be selected as a route to be used since no traffic occurs through the route; however, the route thus selected does not always offer a high transfer performance. Accordingly, no consideration is paid to immediate recovery in case of occurrence of an entire-Network failure in the system disclosed in patent literature 1.

Other examples of computer systems are disclosed in Japanese Patent Application Publication No. 2000-348005 A (patent literature 2) and Japanese Patent Application Publication No. 2007-287064 A (patent literature 3). Patent literatures 2 and 3 disclose storage systems incorporating multiple routes, which offer an improved availability and performance by dynamically switching paths to be used in accordance with the load status and the failure occurrence status.

CITATION LIST

Patent Literatures

Patent literature 1: JP 2007-189615 A
Patent literature 2: JP 2000-348005 A
Patent literature 3: JP 2007-287064 A

Non-Patent Literature

Non-patent literature 1: OpenFlow Switch Specification Version 1.0.0 (Wire Protocol 0x01) Dec. 31, 2009

SUMMARY OF THE INVENTION

The systems disclosed in patent literatures 2 and 3, however, cannot automatically determine routes to be preferentially used in the normal status, since routes to be used are configured in advance. Also, since no consideration is paid to the operation in the case that a dynamic structure modification occurs, the systems disclosed in patent literatures 2 and 3 cannot determine routes to be used when a path failure occurs and when a dynamic structure modification occurs. Furthermore, no consideration is paid to the case that different I/O's exist over the same network, such as FCoE (Fibre Channel over Ethernet (registered trademark)), since the computer systems of patent literatures 2 and 3 are directed to storage systems.

Therefore, an objective of the present invention is to provide a network system which allows communications over a network with a higher performance selected out of a plurality of networks.

A computer system according to the present invention includes: a controller; and a switch which is connected to a different switch via a plurality of networks and performs relaying of received packets in accordance with flow entries configured by said controller. The switch obtains the transfer performance of each of the plurality of networks by transferring test data to the different switch via each of the plurality of networks. The switch also notifies the controller of the transfer performance so that the transfer performance is correlated with each of the plurality of networks. The controller configures a flow entry onto a flow table of the switch, the flow entry specifying a network with a transfer performance equal to or higher than a threshold value out of the plurality of networks, as a transfer route to the different switch.

A communication method according to the present invention is performed on a computer system including a switch which is connected to a different switch via a plurality of networks and performs relaying of received packets in accordance with flow entries configured by a controller. The communication method according to the present invention includes: by a switch transferring test data to the different switch via each of the plurality of networks to obtain the transfer performance of each of the plurality of networks; notifying the controller of the transfer performance so that the transfer performance is correlated with each of the plurality of networks; and by a controller, configuring a flow entry onto a flow table of the switch the flow entry specifying a network with a transfer performance equal to or higher than a predetermined threshold value out of the plurality of networks, as a transfer route to the different switch.

The present invention allows communications over a network with a higher performance selected from a plurality of networks.

BRIEF DESCRIPTION OF DRAWINGS

Objectives, effects and features of the above-described invention will be made clearer from the description of exemplary embodiments in cooperation with the attached drawings wherein:

FIG. 10 is a diagram illustrating one example of the network information table according to the present invention;

FIG. 11 is a diagram illustrating one example of the switch information table according to the present invention (before configuration);

FIG. 13 is a diagram illustrating another example of the switch information table according to the present invention (after the configuration);

FIG. 15 is a diagram illustrating one example of the network information table according to the present invention;

FIG. 17 is a diagram illustrating one example of the load balancing information according to the present invention;

FIG. 18 is a diagram illustrating one example of a source switch view or an inter-switch route view according to the present invention;

FIG. 20 is a diagram illustrating one example of the network flow table according to the present invention;

FIG. 21 is a diagram illustrating one example of the flow table according to the present invention.

DESCRIPTION OF EXEMPLARY EMBODIMENTS (Overview)

Figure 1:
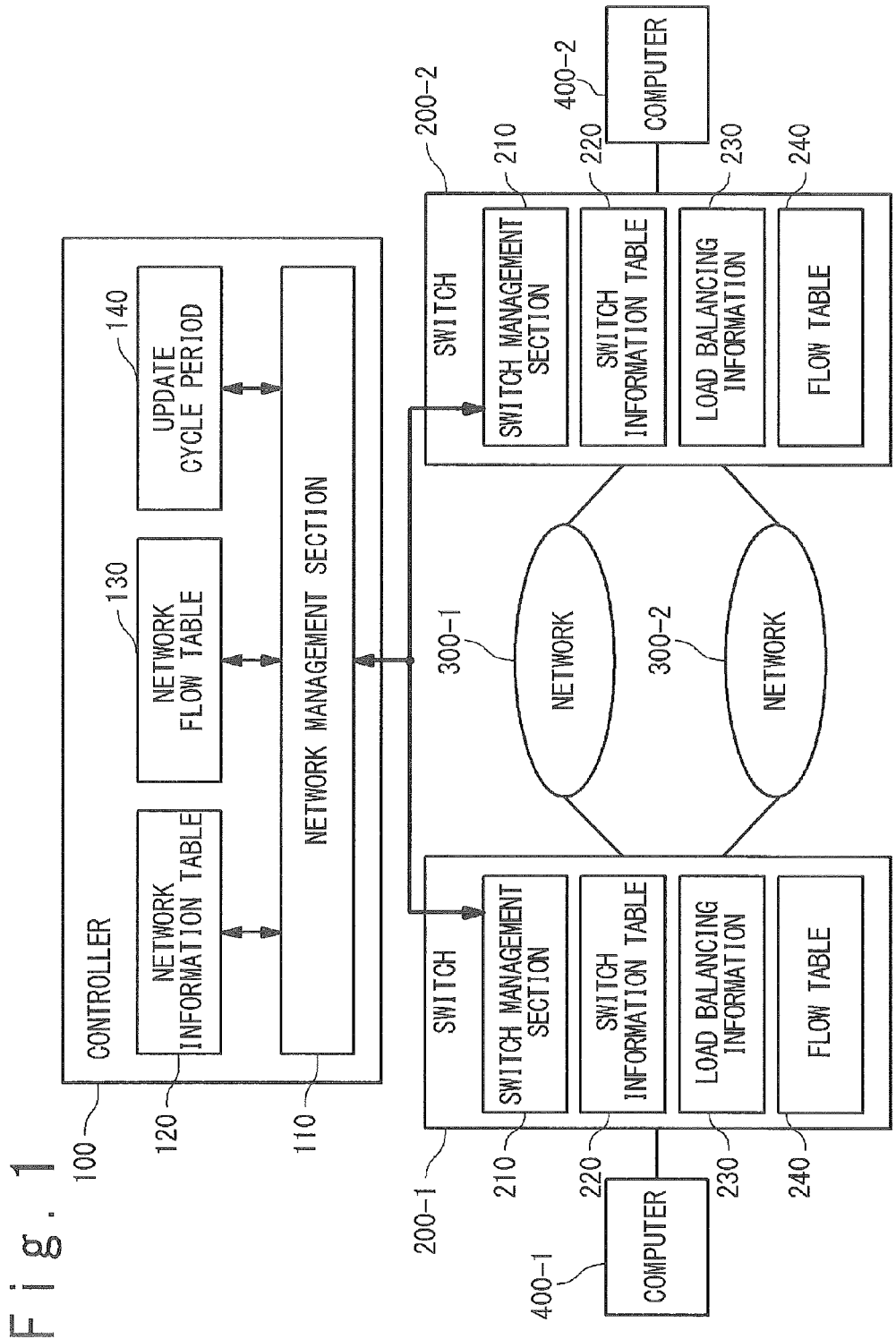
FIG. 1 is a diagram illustrating one example of the structure of a computer system in an exemplary embodiment according to the present invention.

A controller according to the present invention obtains the transfer performances (e.g. the transfer rates) of networks measured by switches and automatically selects networks to be used for communications on the basis of the obtained transfer performances and a load balancing policy. Flow entries specifying networks to be used for communications are configured onto the switches in accordance with the OpenFlow protocol. This allows automatically selecting networks with superior transfer performances from among a plurality of communication networks. Also, the controller periodically obtains the transfer performances of the networks and configures optimum routes (optimum flows) onto the switches. This allows automatic switching to communications via optimum routes in a network, the structure of which is dynamically modified.

In the following, a description is given of exemplary embodiments of the present invention with reference to the attached drawings. The same or similar reference numbers in the drawings denote the same, similar or equivalent components.

(Computer System Structure)

Referring to FIG. 1, the structure of a computer system according to the present invention will be described below. FIG. 1 is a diagram illustrating the structure of a computer system in an exemplary embodiment according to the present invention. The computer system according to the present invention performs establishment of communication routes and transfer control of packet data by using OpenFlow. Referring to FIG. 1, the computer system according to the present invention includes: an OpenFlow controller 100 (hereinafter, referred to as controller 100), a plurality of OpenFlow switches 200-1 and 200-2 (hereinafter, referred to as switches 200-1 and 200-2), networks 300-1, 300-2 and a plurality of client terminals 400-1 and 400-2 (hereinafter, referred to as computers 400-1 and 400-2). A description will be given with definitions, in which the switches 200-1 and 200-2 are collectively referred to as switches 200 if not distinguished, the networks 300-1 and 300-2 are collectively referred to as networks 300 if not distinguished and the computers 400-1 and 400-2 are collectively referred to as computers 400 if not distinguished. It should be noted that, although two switches 200, two networks 300 and two computers 400 are illustrated in FIG. 1, the numbers of the switches 200, the networks 300 and the computers 400 may be arbitrarily selected, not limited to two.

Each computer, 400, which is a computer apparatus including a not-shown CPU, network interface (I/F) and memory (or recording medium), performs communications with another computer 400 by executing programs in the memory (or the recording medium).

In the computer system according to the present invention, the communications between the computers 400 are performed via the switches 200 connected via the plurality of networks 300. The communications between the switches 200 connected via the plurality of networks 300 are controlled in accordance with the OpenFlow (which is also referred to as the programmable flow) protocol. The controller 100 and the switches 200 are connected via a network for control.

In detail, the controller 100 controls communication route packet transfer related to packet transfers in the system by using an OpenFlow technique. The OpenFlow technique is a technique in which a controller (the controller 100 in this exemplary embodiment) configures route information in units of multilayers and flows onto the switches 200 in accordance with a routing policy (flow entries: flows and actions), to thereby achieves route control and node control (refer to non-patent literature 1 for details.) This allows separating the route control function from routers and switches, achieving optimized routing and traffic management through a centralized control by the controller. The switches 200, to which the OpenFlow technology is applied, handles communications as end-to-end flows, not in units of packets and frames as in conventional routers and switches.

The controller 100 according to the present invention is a computer apparatus including a not-shown CPU, network interface (I/F) and memory (or recording medium). Stored in the not-shown memory (or the recording medium) of the controller 100 are a network information table 120, a network flow table 130, an update cycle period 140 and a network management program. In the controller 100, the function of a network management section 110 is realized by executing the network management program by the not-shown CPU.

The network management section 110 determines networks 300 to be used as communication routes on the basis of the connection status and load status of the networks 300, which obtained from the switches 200. The network management section 110 then controls the operations of the switches 200 (e.g. relaying and discarding of packet data) by configuring or updating flow entries (rules 241 and actions 242) in flow tables 240 held in the switches 200.

In detail, the network management section 110 configures, deletes or updates the rules according to which entities to be controlled are determined, the actions specifying the operations and the communication routes on the basis of reception notifications of first packets and load information received from the switches 200. Here, the first packet is packet data which does not match any rules 241 configured in the flow table 240 of a switch 200.

Figure 9:
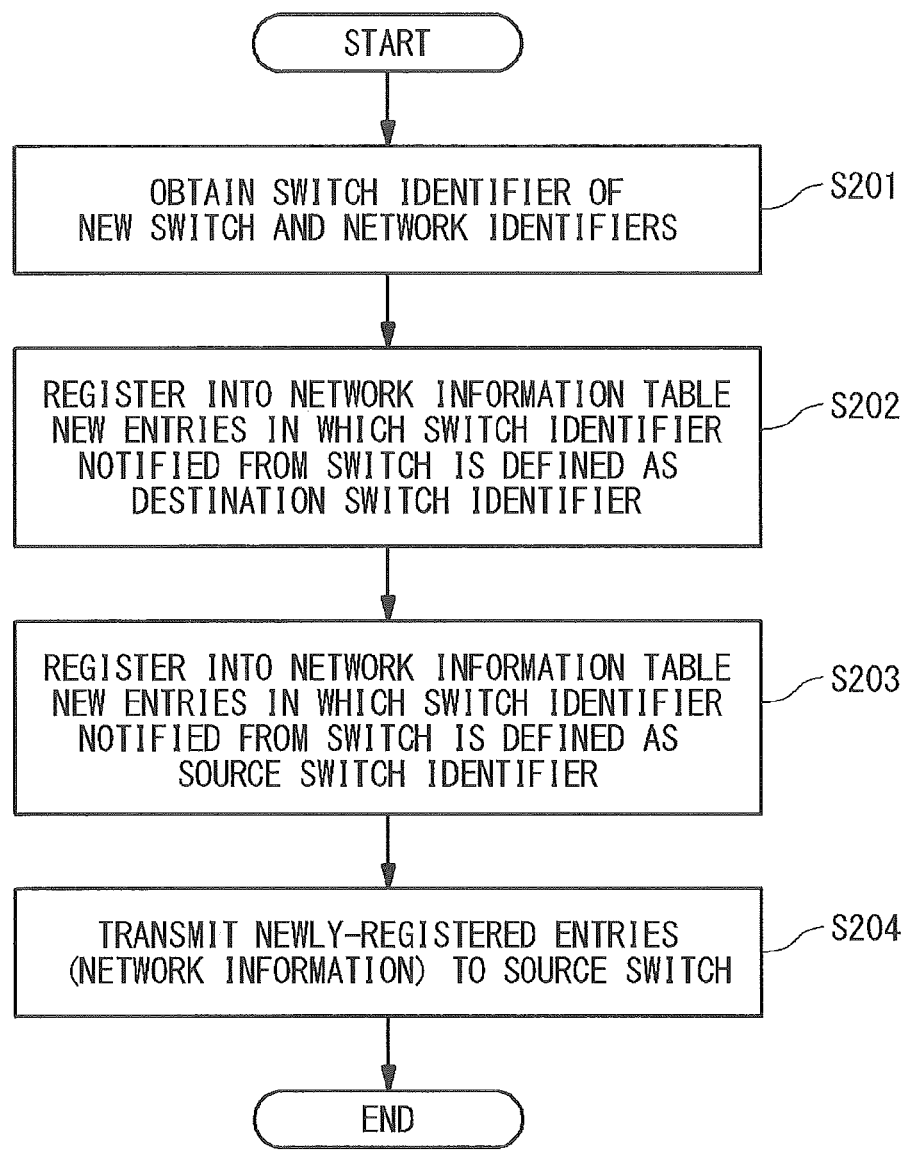
FIG. 9 is a flow chart illustrating a configuration operation in the controller when a connection is modified.

Specified in a rule 241 is, for example, a combination of addresses and identifiers of layers 1 to 4 defined in the OSI (Open systems interconnection) reference model, which are included in the header information of TCP/IP packet data. For example, a combination of a physical port defined in layer 1, a MAC address defined in layer 2, an IP address defined in layer 3, and a port number and VLAN tag (VLAN id) defined in layer 4, which are shown in FIG. 9, is configured as a rule 241. It should be noted that a priority (VLAN priority) may be given to the VLAN tag.

Here, an identifier such as the port number, an address or the like configured in a rule 241 may be defined as a predetermined range. It is desirable that destination and source addresses or the like are distinguished in the rules 241. For example, a range of the MAC destination address, a range of the destination port number specifying a connection destination application, a range of the source port number specifying a connection source application may be configured as a rule 241. Furthermore, an identifier specifying the data transfer protocol may be configured as a rule 241.

Specified in an action 242 is, for example, a method of handling TCP/IP packet data. For example, information indicating whether relaying is to be offered for received packet data, and, if so, the destination switch 200 and network 300 are configured as an action 242. Additionally, information instructing to perform duplication or discarding of packet data may be configured in an action 242.

Figure 2:
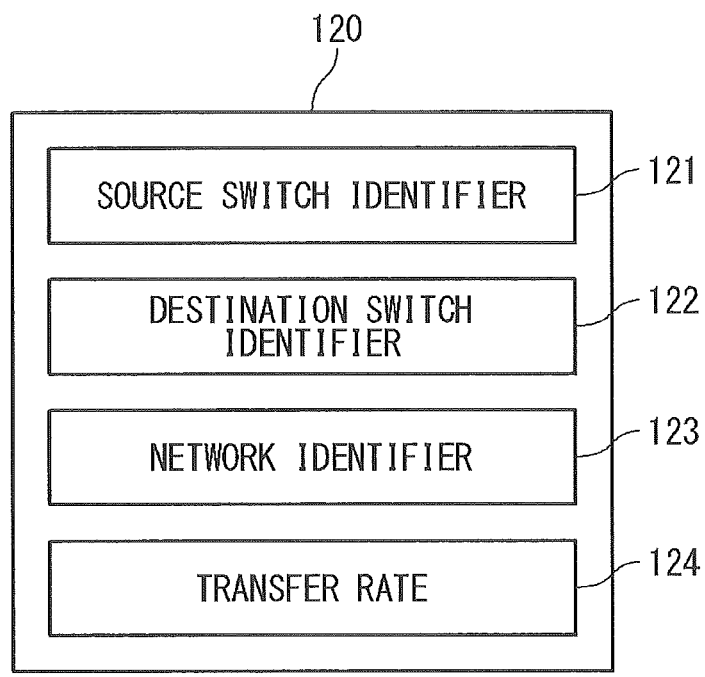
FIG. 2 is a diagram illustrating the structure of a network information table according to the present invention.

FIG. 2 is a diagram illustrating the structure of the network information table 120 according to the present invention. Referring to FIG. 2, in the network information table 120, a source switch identifier 121, a destination switch identifier 122, a network identifier 123 and a transfer rate 124 are correlated and stored in each entry. A unique switch identifier is given to each switch 200 according to the present invention and a unique network identifier is given to each network 300. The source switch identifier 121 is an identifier of a switch 200 which is a source of packets for measuring the associated transfer rate 124 and the destination switch identifier 122 is an identifier of the switch 200 which is the destination of the packets. The network identifier 123 is an identifier of a network 300 disposed between the switch 200 identified by the associated source switch identifier 121 and the switch 200 identified by the associated destination switch identifier 122. The transfer rate 124 indicates the transfer rate between the switches 200 via the network 300 identified by the associated network identifier 123. For example, the average throughput speed of communications between the switches 200 performed at predetermined intervals is recorded in the network information table 120 as the transfer rate 124.

Figure 3:
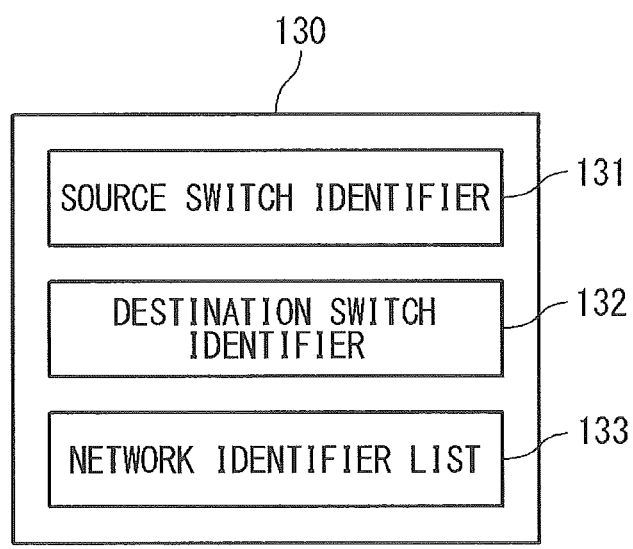
FIG. 3 is a diagram illustrating the structure of a network flow table according to the present invention.

FIG. 3 is a diagram illustrating the structure of the network flow table 130 according to the present invention. Stored in the network flow table 130 is information indicating networks through which each switch 200 performs communications. In detail, in the network flow table 130, a destination switch identifier 132 and a network identifier list 133 are correlated and stored in an entry which includes a source switch identifier 131 as a key. The source switch identifier 131 is the identifier of a switch 200 which is a source of packets and the destination switch identifier 132 is the identifier of the switch 200 which is the destination of the packets. Stored in the network identifier list 133 are network identifiers of networks 300 disposed between the switch 200 identified by the associated source switch identifier 131 and the switch 200 identified by the destination switch identifier 132. A desired number of network identifiers can be stored in the network identifier list 133.

The update cycle period 140 includes a cycle period at which the network management section 110 obtains transfer performances from the switches 200. The update cycle period 140 may be different depending on the switches 200; alternatively, a common cycle period may be defined for all the switches 200.

The switches 200 control communications via the networks 300. In detail, a switch 200 determines the destination of data transmitted via a computer 400 and a network 300. In this operation, the switch 200 determines the processing method (or the action) to be performed for received packets on the basis of the flow table 240 which is configured (updated) by the controller 100, in accordance with the OpenFlow protocol.

The switches 200 according to the present invention each include a not-shown CPU, network interface (I/F) and memory (or recording medium). Stored in the not-shown memory (or the recording medium) of each switch 200 are a switch management program, a switch information table 220, load balancing information 230 and a flow table 240. The function of a switch management section 210 is realized in each switch 200 by executing the switch management program by the not-shown CPU.

The switch management section 210 selects networks 300 which are used as destinations of data on the basis of its own flow table 240 and performs communications via the selected networks 300. The system according to the present invention is configured so that communications can be performed via a plurality of networks 300 by using a conventional technique, such as link aggregation. Also, the switch management section 210 periodically transmits test data for obtaining the transfer performances of the networks 300 connected to itself (or available to itself). Furthermore, the switch management section 210 performs configuration (update) of the flow table 240, the obtainment of the transfer performances and the notification of the transfer performances to the controller, in response to flow table configuration (update) commands and transfer performance obtainment commands received from the controller 100.

Figure 4:
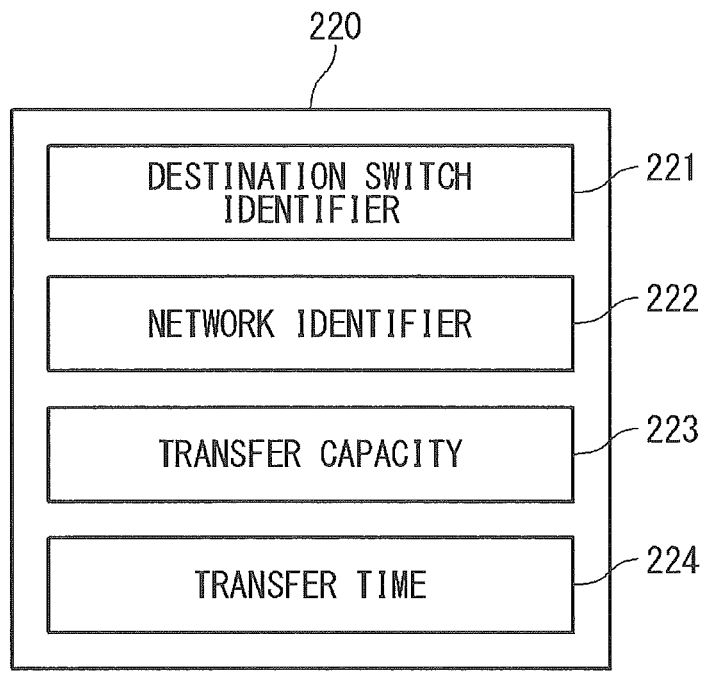
FIG. 4 is a diagram illustrating the structure of a switch information table according to the present invention; transmitted

FIG. 4 is a diagram illustrating the structure of the switch information table 220 according to the present invention. Referring to FIG. 4, a destination switch identifier 221, a network identifier 222 and a transfer performance (a transfer capacity 223 and transfer time 224) are correlated and stored in an entry in the switch information table 220. The destination switch identifier 221 is an identifier of a switch 200 which is a packet transfer destination. The network identifier 222 is an identifier of the network 300 used for the packet transfer. The transfer capacity 223 indicates the total sum of the sizes of data transferred within a predetermined time in the packet transfer. The transfer time 224 indicates the sum of the time periods necessary for the packet transfer. For example, the size of data transferred within the transfer time 224 is correlated with the transfer time 224 and recorded in the switch information table 220 as the transfer capacity 223.

Figure 5:
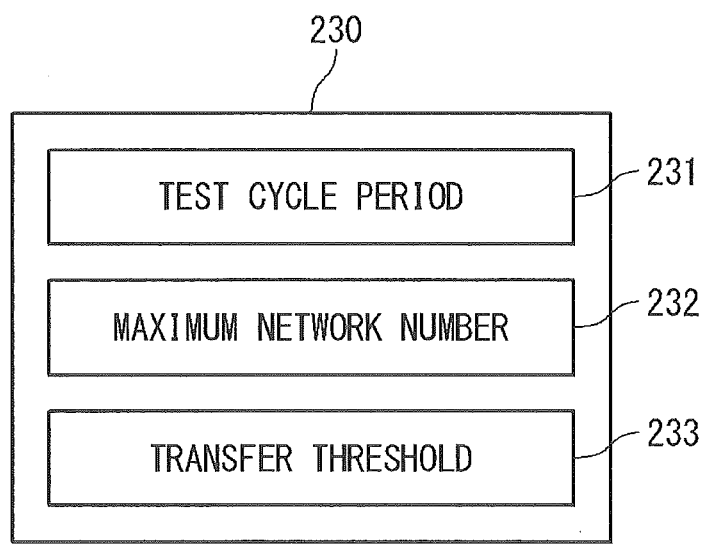
FIG. 5 is a diagram illustrating the structure of load balancing information according to the present invention.

FIG. 5 is a diagram illustrating the structure of the load balancing information 230 according to the present invention. Referring to FIG. 5, the load balancing information 230 includes a test cycle period 231, a maximum network number 232 and a transfer threshold 233. The test cycle period 231 is information indicating the cycle period at which the switch 200 performs communications for obtaining the transfer performance (for example, the transfer capacity 223 and transfer time 224). The maximum network number 232 is information indicating the allowed maximum number of the networks which the switch 200 can be connected to (or which the switch 200 can use). The transfer threshold 233 is information indicating the ratio of paths available in the network 300 with the highest performance selected out of available networks. It is preferable that the load balancing information 230 is configured in advance; alternatively, the load balancing information 230 may be configured or updated by the switch 200 itself or by the controller 100.

Figure 6:
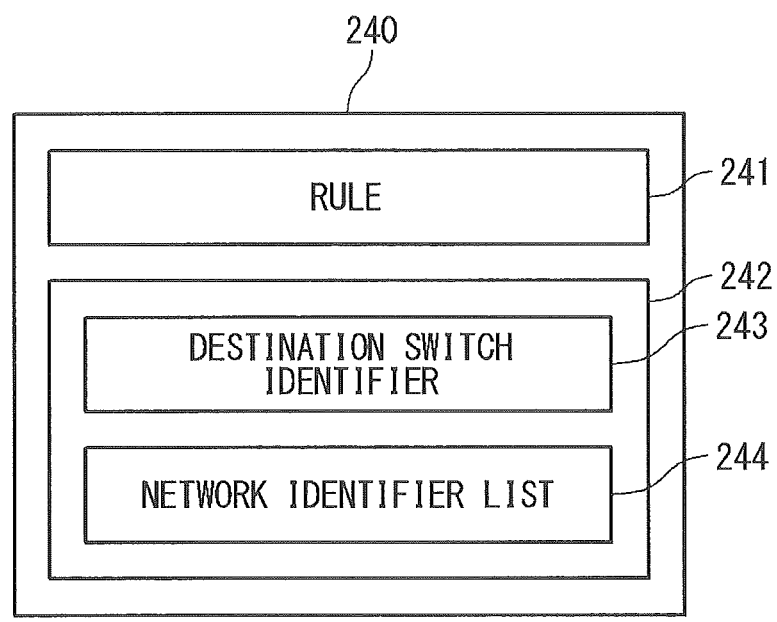
FIG. 6 is a diagram illustrating the structure of a flow table according to the present invention.

FIG. 6 is a diagram illustrating the structure of the flow table 240 according to the present invention. In the flow table 240, a rule 241 and action 242 are configured as a flow entry. The action 242 includes an identifier of a data transfer destination switch (destination switch identifier 243) and a list of identifiers of the networks 300 used for the transfer (network identifier list 244). A desired number of network identifiers can be registered in the network identifier list 244.

When header information of a received packet matches (or coincides with) a rule 241 recorded in the flow table 240, the packet data are transferred by the switch management section 210 to a different switch 200 specified in the action 242 via the network 300 specified by the action 242.

Figure 7:
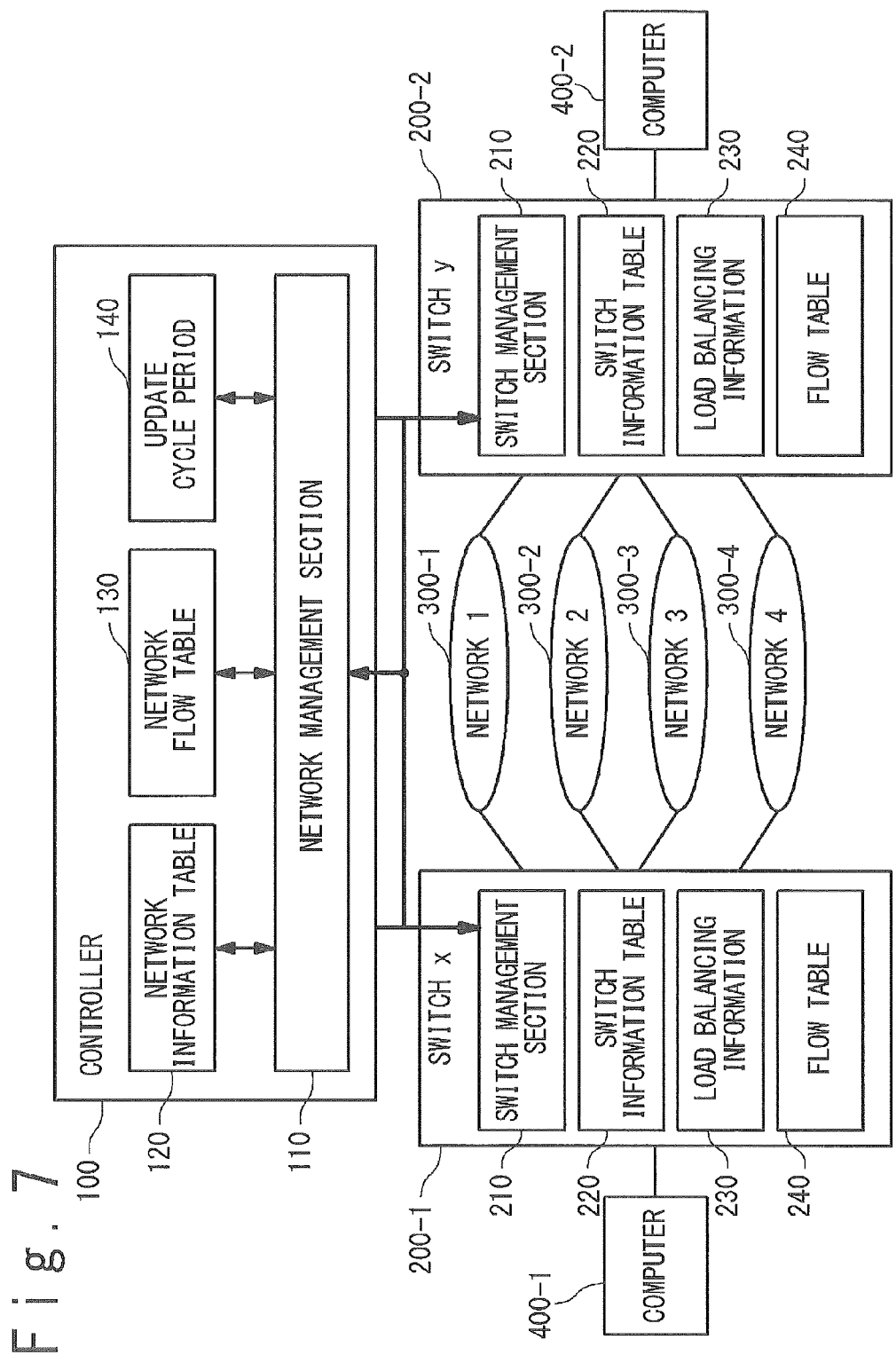
FIG. 7 is a diagram illustrating another example of the structure of a computer system in the exemplary embodiment according to the present invention.

Referring to FIG. 1, the networks 300-1 and 300-2 are each an independent network, and the number of networks used (or connected) between the switches 200 are not limited to two. As illustrated in FIG. 7, for example, four networks 300-1 to 300-4 may be disposed between the switches 200-1 and 200-2.

(Operation)

Next, the operation of the computer system according to the present invention will be described with reference to the computer system illustrated in FIG. 7. In the following, a description is given to one example in which the switch identifiers of the switches 200-1 and 200-2 are "SWITCH x" and "SWITCH y" and the network identifiers of the networks 300-1 to 300-4 are "NETWORK 1" to "NETWORK 4".

Figure 8:
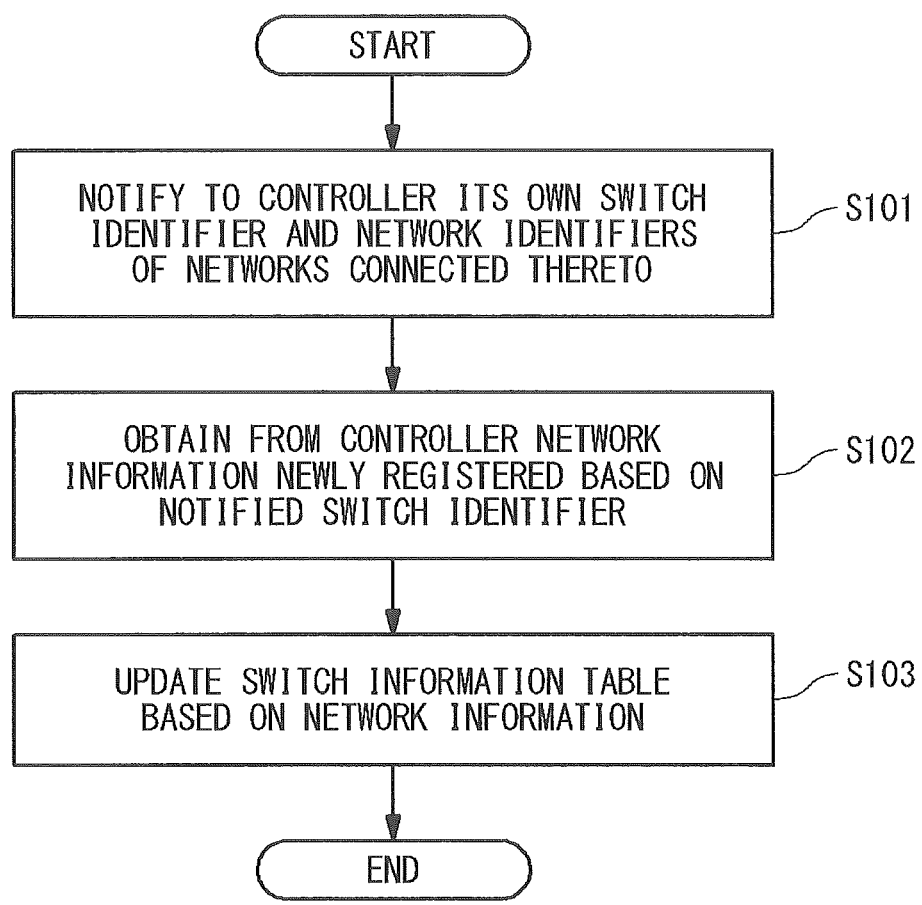
FIG. 8 is a flow chart illustrating an initial configuration operation in the switch when a connection is modified.

First, an initial configuration operation in a switch 200 is described with reference to FIG. 8. FIG. 8 is a flow chart illustrating the initial configuration operation in a switch 200 according to the present invention when the connection is modified. Here, it is assumed that nothing is initially configured in the switch information table 220 and the flow table 240 in the switch 200 and values in accordance with the operation policy are configured in the load balancing information 230.

The switch management section 210 of a switch 200 which is newly added to the system notifies its own switch identifier and the network identifiers of the networks to which the switch 200 is connected, to the network management section 110 of the controller 100 (step S101). Each network identifier notified in this operation is, for example, information which identifies a combination of the port number of the port connected to a network 300 and the port number of the port of a different switch 200 connected via the network 300.

The switch 200 obtains network information transmitted from the controller 100 in response to the notified switch identifier and network identifiers (step S102). This network information is information other than the transfer rate 124 selected from information updated on the basis of the notified switch identifier and network identifiers in the network information table 120. Here, the switch 200 may obtain only the newly-registered network information out of the network information table 120; the switch 200 may obtain the entire network information registered in the network information table 120.

The switch 200 updates the switch information table 220 on the basis of the obtained network information (step S103). In detail, the switch 200 registers entries including the source switch identifier 121 which matches its own switch identifier selected from the obtained network information, into the switch information table 220. In this operation, the switch 200 newly registers entries which include an unregistered destination switch identifier and network identifier, into the switch information table 220. Here, a destination switch identifier 122 and a network identifier 222 included in the network information transmitted from the controller 100 are newly registered into the switch information table 220 as a destination switch identifiers 221 and a network identifier 222. The transfer capacity 223 and the transfer time 224 of the entries which are newly registered into the switch information table 220 are set to "0".

Next, an initial configuration operation in the controller 100 is described with reference to FIG. 9. FIG. 9 is a flow chart illustrating the initial configuration operation in the controller 100 according to the present invention when the connection is modified. Here, it is assumed that nothing is initially configured in the network information table 120 and the network flow table 130 in the controller 100 and a value in accordance with the operation policy is configured as the update cycle period 140.

The network management section 110 of the controller 100 newly registers into the network information table 120 the switch identifier and network identifiers notified from the switch 200 which is newly connected to the system (steps S201 and S202). In detail, the network management section 110 newly registers the unregistered switch identifier notified from the switch 200 into the network information table 120, correlating the source switch identifiers 121 determined as the switch identifiers already-registered in the network information table 120 with the destination switch identifier 122 determined as the unregistered switch identifier. In this operation, the network management section 110 identifies the network connected between the switch 200 associated with a source switch identifier 121 and the switch 200 associated with a destination switch identifier 122, referring to the already-registered network identifiers and the unregistered network identifiers notified from the switch 200. The network management section 110 then newly registers the identifier of the network thus identified as a network identifier 123 into the network information table 120, correlating the network identifier 123 with the source switch identifier 121 and the destination switch identifier 122. It should be noted that the transfer rates 124 described in the newly-registered entries of the network information table are set to "0".

The network management section 110 newly registers entries in which the identifier of the switch 200 newly added to the system is defined as the source switch identifiers 121, the already-registered switch identifiers are defines as the destination switch identifiers 122 and the identifiers of the networks connected between the relevant switches are defined as the network identifiers 123 and the transfer rates 124 are set to "0" (step S203). In other words, the network management section 110 newly registers entries which are obtained by counterchanging the source switch identifiers 121 and the destination switch identifiers 122 of the entries which have been newly registered at step S202.

The network management section 110 then transmits to the switches 200 the network information in the network information table 120, which has been newly registered at steps S202 and S203 (step S204). The network management section 110 transmits the network information related to the connections of the switches 200 and the networks 300 (here, the source switch identifiers 121, the destination switch identifiers 122 and the network identifiers 123) selected out of the entries newly registered into the network information table 120, to the switches 200 associated with the source switch identifiers 121. It should be noted that the network management section 110 may transmits the network information in all of the entries already registered in the network information table 120, to the associated switches 200 or to all of the switches 200.

As one example, registration updates of the network information table 120 and the switch information table 220 are described with respect to the case that the switch 200-1 is newly added to the system illustrated in FIG. 7. It is assumed here that the switch 200-2 have been already connected to the system and the switch identifier "SWITCH y" thereof has been already registered in the network information table 120.

The switch 200-1 notifies the controller 100 of its own switch identifier "SWITCH x" and the network identifiers "NETWORK 1" to "NETWORK 4" of the networks 300 connected to the switch 200-1 itself. The controller 100 registers four entries in which the already-registered switch identifier "SWITCH y" is defined as the source switch identifiers 121, the notified switch identifier "SWITCH x" is defined as the destination switch identifiers 122, the network identifiers "NETWORK 1" to "NETWORK 4" are defined as the network identifiers 123 and the transfer rates are set to "0". Additionally, the controller 100 registers four entries in which the notified switch identifier "SWITCH x" is defined as the source switch identifiers 121, the already-registered switch identifier "SWITCH y" is defined as the destination switch identifiers 122, the network identifiers "NETWORK 1" to "NETWORK 4" are respectively defined as the network identifiers 123 and the transfer rates are set to "0". The result is that the registration update of the network information table 120 is achieved as illustrated in FIG. 10.

The controller 100 extracts network information from the network information table 120 which has been updated and transmits the extracted network information to the switches 200-1 and 200-2. For example, the controller 100 transmits the network information in the entries associated with the source switch identifiers 121 defined as "SWITCH x" selected out of the network information table 120, to the switch 200-1 associated with this switch identifier. Additionally, the controller 100 transmits the network information in the entries associated with the source switch identifiers 121 defined as "SWITCH y", to the switch 200-2 associated with this switch identifier.

Referring to FIG. 11, the switch 200-1, on the basis of the network information obtained from the controller 100, newly registers into the switch information table 220 four entries in which the destination switch identifiers 221 are defined as "SWITCH y", the network identifiers 222 are defined as "NETWORK 1" to "NETWORK 4", respectively, and the transfer capacities 223 and the transfer times 224 are set to "0". Similarly, the switch 200-2 newly registers entries in which the destination switch identifiers 221 are defined as "SWITCH x" into its own switch information table 220.

Although a description is given of the case that the network information newly registered into the network information table 120 is transmitted to the associated switches 200 in the above-described example, implementations are not limited to such operation; the entire network information already registered in the network information table 120 may be transmitted to all of the switches 200 which have been already registered. In this case, newly registered into the switch information table 220 in each switch 200 is only the network information having a destination switch identifier which is not registered in its own switch information table 220, selected out of the network information which has a source switch identifier identical to its own switch identifier.

In the following, a description is given of the operation in the case that the communication from the controller 100 to a switch 200 has become impossible. It is preferable that the network management section 110 of the controller 100 transmits a signal for connection confirmation to all or desired ones of switches 200 in the system, periodically or at desired timing. In this case, the network management section 110 can check whether each switch 200 is connected to the system, on the basis of a response signal received from the switch 200 to the signal. Alternatively, the network management section 110 may determine that communications with a switch 200 is suspected (or the switch 200 has got rid of the system) when the switch 200 fails to notify the transfer performances for a predetermined time duration.

When the communication with a switch 200 has become impossible (or when determining that a switch 200 has got rid of the system), the network management section 110 searches all of the entries of the network information table 120 and deletes entries in which the source switch identifier 121 or the destination switch identifier 122 is identical to the switch identifier of the switch 200.

In the computer system according to the present invention, the transfer performances among the switches 200 via the networks 300 are measured by the switches 200 and notified to the controller 100. The controller 100 determines networks 300 to be used as communication routes by referring to the transfer performances of the networks 300, and configures (or updates) the flow tables 240 of the switches 200 in accordance with the OpenFlow protocol.

Figure 12:
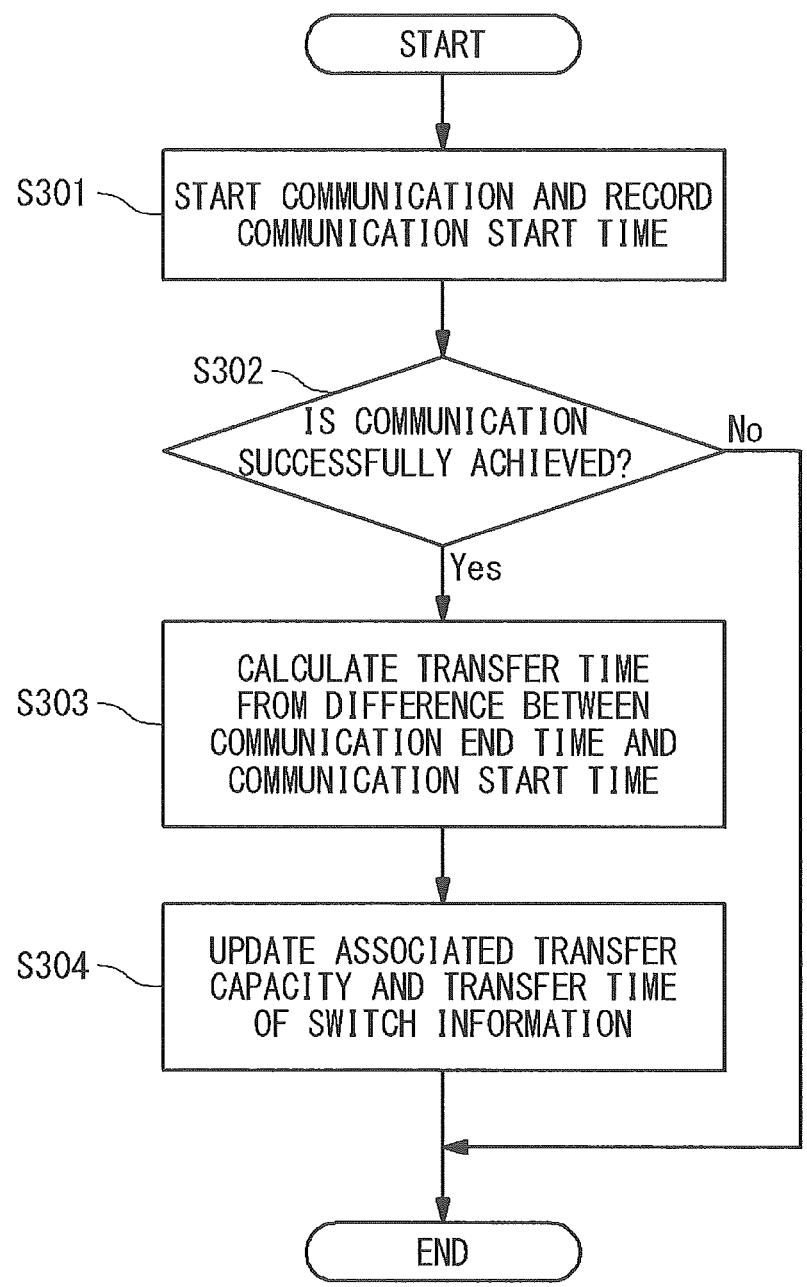
FIG. 12 is a flowchart illustrating a configuration (update) operation of the switch information table according to the present invention.

First, the measurement operation of the transfer performances in the switches 200 is described with reference to FIG. 12. FIG. 12 is a flow chart illustrating the configuration (update) operation of a transfer capacity 223 and a transfer time 224 in the switch information table 220 according to the present invention.

When receiving a communication request to a different switch 200, the switch management section 210 starts a communication by using the networks 300 specified in the flow table 240 and records the communication start time (step S301). When packet data transferred from a computer 400 match a rule 241 of the flow table 240, for example, a packet transfer is performed via the networks 300 in accordance with the action 242 associated with the matching rule. In the meantime, the switch management section 210 records the packet transfer start time into a not-shown memory (or a recording medium).

When the communication is successfully completed in the switch 200, the switch management section 210 calculates the transfer time 224 from the difference between the communication end time and the communication start time (steps S302—Yes and S303). When the communication is not successfully completed, on the other hand, the calculation of the transfer time 224 is not performed (step S302—No).

The switch management section 210 updates the transfer capacities 223 and the transfer times 224 of the entries associated with the networks 300 used for the communication and the communication destination switch 200 in the network information table 120 (step S304). In detail, the switch management section 210 extracts from the network information table 120 entries associated with the destination switch identifier 243 and network identifier list 244 specified by the action 242 which matches the packet, and updates the transfer capacities 223 and the transfer times 224 in the extracted entries. The amount of packet data transferred from the communication start until the communication end is recorded as the transfer capacity 223 and the transfer time calculated at step S303 is recorded as the transfer time 224.

In the system illustrated in FIG. 7, for example, the switch information table 220 is updated as illustrated in FIG. 13, when communications are performed from the switch 200-1 to the switch 200-2 via the networks 300-1 to 300-4. A transfer capacity 223 and transfer time 224 may be rewritten and updated to the latest transfer capacity and transfer rate; instead, an accumulated transfer capacity and transfer rate within a predetermined time period may be recorded as a transfer capacity 223 and transfer time 224. Alternatively, the average values of the transfer capacities and transfer rates for a predetermined number of times of communications or statistic values calculated by a predetermined algorithm may be recorded as a transfer capacity 223 and transfer time 224.

Some kind of communications is necessary for updating a transfer performance (here, a transfer capacity and transfer time) through the operation illustrated in FIG. 12. In other words, information associated with a network 300 which is not used for communications is not updated. It is therefore preferable that the switch management section 210 updates the transfer performances of all the networks 300 connected to its own switch 200 by performing communications for the test periodically or at desired timing. For example, the switch management section 210 transfers a predetermined data amount of test data to a different switch 200 via a network 300 connected to its own switch 200 at periodically or at desired timing, and updates the transfer capacity 223 and transfer time 224 associated with the network 300 and the switch 200 in the same operation as that illustrated in FIG. 12. When periodically performing communications for the test, the switch management section 210 transmits test packet data in response to an elapse of the test cycle period 231 set in the load balancing information 230. This allows a switch 200 to obtain the transfer performance of a network 300 even when a communication request, such as packet transfer, is not issued by another device.

Figure 14:
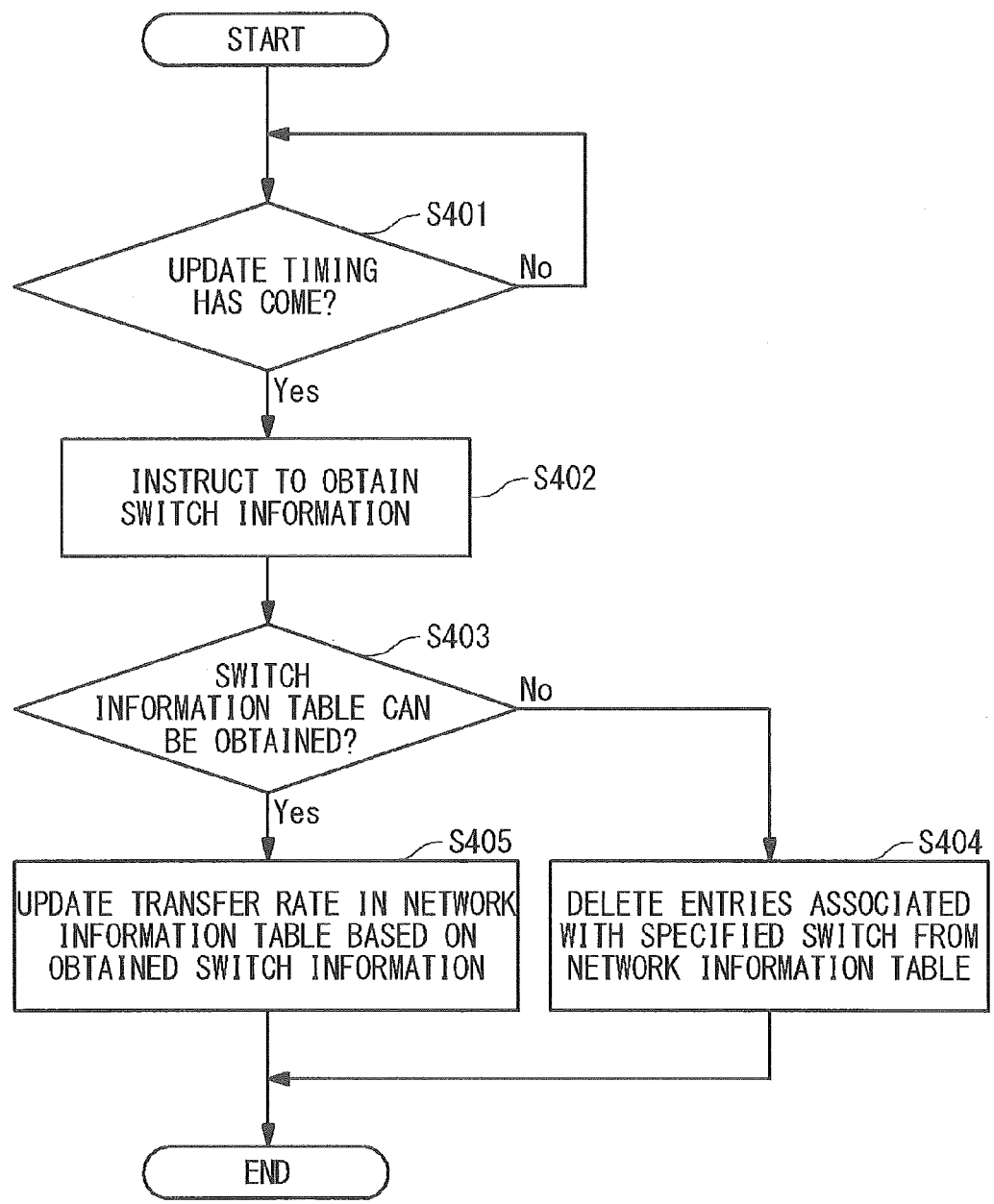
FIG. 14 is a flowchart illustrating a configuration (update) operation of the network information table according to the present invention.

Next, the configuration (update) operation of the network information table 120 according to the present invention is described with reference to FIGS. 14 and 15. FIG. 14 is a flow chart illustrating the configuration (update) operation of the network information table 120 according to the present invention.

The network management section 110 issues obtainment instructions of switch information to the switches 200 in response to an elapse of the update cycle period 140 (steps S401—Yes and S402). When receiving an obtainment instruction of switch information, the switch management section 210 transmits its own switch identifier and the switch information table 220 as the switch information to the network management section 110.

When not receiving a response to an obtainment instruction of switch information within a predetermined time, the network management section 110 determines that the communication to the switch 200 which does not respond has become impossible and deletes entries associated with the switch 200 from the network information table 120 (steps S403—No and S404). When receiving switch information as a response to the obtainment instruction of switch information from a switch 200, the network management section 110 updates the network information table 120 in accordance with the received switch information (steps S403—Yes and S405).

In detail, the network management section 110 identifies entries including a source switch identifier 121 identical to the received switch identifier and a destination switch identifier 122 identical to any of the destination switch identifiers 221 of the received switch information table 220, from the network information table 120. The network management section 110 calculates the transfer rates (transfer capacity/transfer time) of the respective networks from the transfer capacities 223 and transfer times 224 of the respective networks indicated in the received switch information table 220, and records the calculated transfer rates in the identified entries.

When receiving a switch information table 220 as illustrated in FIG. 13 from the switch 200-1 illustrated in FIG. 7, for example, the network management section 110 updates entries which have a source switch identifier 121 identical to the switch identifier "SWITCH x" of the switch 200-1, and a destination switch identifier 122 identical to the destination switch identifier 221 "SWITCH y", to configure the network information table 120 as illustrated in FIG. 15. In this operation, the transfer rates 124 associated with the networks 300-1 to 300-4 (which have the network identifiers "NETWORK 1" to "NETWORK 4") are set to "1000 MB/sec", "800 MB/sec", "300 MB/sec" and "200 MB/sec", which are values obtained by dividing the transfer capacities 223 illustrated in FIG. 13 by the transfer times 224. When the transfer capacity 223 is "0", that is, when no communication is performed, the transfer rate 124 is set to "0".

The transfer rates 124 of all of the entries are updated as illustrated in FIG. 7, for example, by performing the process of steps S403, S404 and S405 for all of the entries of the network information table 120.

Figure 16:
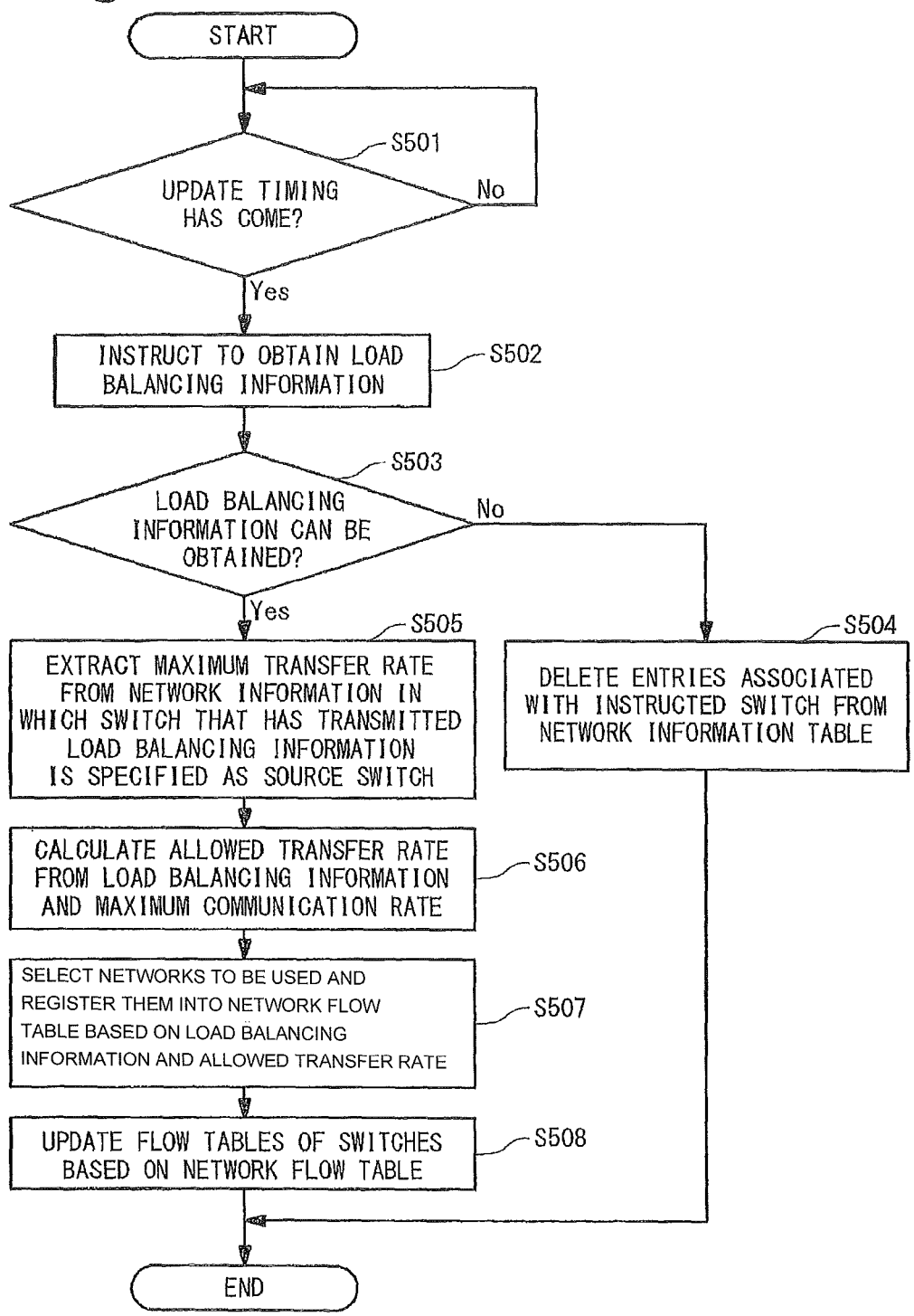
FIG. 16 is a flow chart illustrating configuration (update) operation of the network flow table and flow table according to the present invention.

Next, the update operation of the network flow table 130 and the flow table 240 is described with reference to FIGS. 16 to 21. FIG. 16 is a flow chart illustrating the configuration (update) operation of the network flow table 130 and the flow table 240 according to the present invention.

The network management section 110 issues obtainment instructions of load balancing information 230 to the switches 200 in response to an elapse of the update cycle period 140 (steps S501—Yes and S502). When receiving an obtainment instruction of load balancing information 230, the switch management section 210 transmits its own switch identifier and load balancing information 230 to the network management section 110. It should be noted that the timing of the obtainment instructions of the load balancing information 230 at step S502 and the timing of the obtainment instructions of the switch information at step S402, that is, the update cycle periods 140 of steps S502 and S402 may be the same or different.

When not receiving a response to an obtainment instruction of load balancing information 230 within a predetermined time, the network management section 110 determines that the communication with the switch 200 which does not respond has become impossible and deletes the entries associated with the switch 200 from the network information table 120 (steps S503—No and S504). When receiving the switch identifier and the load balancing information 230 from a switch 200 as a response to an obtainment instruction of the load balancing information 230, the network management section 110 determines networks to be used for inter-switch communications on the basis of the received load balancing information 230, and configures (or updates) the network flow table 130 and the flow table 240 of this switch 200 (steps S503—Yes and S505 to S508).

First, the network management section 110 extracts the transfer rate 124 which is maximum for each destination switch identifier 122 as the maximum transfer rate, out of the entries (network information) having a source switch identifier 121 identical to the switch identifier of the switch 200 which has transmitted the load balancing information 230, in the network information table 120 (step S505).

A description is given below of a specific example of step S505. The network management section 110 extracts from the network information table 120 entries associated with the source switch identifier 121 identical to the received switch identifier as a source switch view. The network management section 110 generates a destination switch list in which all the destination switch identifiers 122 described in the source switch view are listed.

The network management section 110 extracts entries including a predetermined destination switch identifier 122 from the source switch view, and defines the extracted entries as inter-switch route view. Registered in the inter-switch route view are the network identifiers 123 and transfer rates 124 of the networks 300 which are routed from the switch 200 associated with the source switch identifier 121 to the switch 200 associated with the predetermined destination switch identifier 122. The network management section 110 searches all the entries of the extracted inter-switch route view for the maximum transfer rate 124 and determines the maximum transfer rate 124 as the maximum transfer rate of the networks 300 between the relevant switches. The network management section 110 performs such determination of the maximum transfer rate of inter-switch networks for every destination switch registered in the destination switch list. As a result, the network 300 which offers the highest transfer rate from the switch 200 which transmits the load balancing information 230 to a different switch 200 is identified for every destination switch.

The network management section 110 then calculates an allowed transfer rate from the load balancing information 230 and the maximum transfer rate calculated at step S505. For example, the network management section 110 calculates the value obtained by multiplying the transfer threshold 233 of the load balancing information 230 by the maximum transfer rate as the allowed transfer rate. In one specific example, the allowed transfer rate is 600 MB/sec, when the transfer threshold 233 is 60% and the maximum transfer rate is 1000 MB/sec. Such calculation of the allowed transfer rate of the inter-switch network is performed for every destination switch registered in the destination switch list. As a result, the allowed transfer rate from the switch 200 which transmits the load balancing information 230 to a different switch 200 is identified for every destination switch.

Next, the network management section 110 selects the networks to be used for communications on the basis of the load balancing information 230 and the allowed transfer rate calculated at step S506 and registers the selected networks into the network flow table 130 (or updates the network flow table 130) (at step S507). In this operation, the network management section 110 compares the allowed transfer rate calculated at step S506 with the transfer rate 124 for every entry in the inter-switch route view and selects the entries in which the transfer rate 124 is equal to or higher than the allowed transfer rate. At this time, an entry in which the transfer rate 124 is zero is excluded from the selected entries. When the number of entries in which the transfer rate 124 is equal to or higher than the allowed transfer rate is larger than the maximum network number 232 of the load balancing information 230, on the other hand, a further selection is performed. For example, entries the number of which is identical to the maximum network number 232 are selected in the order of the higher transfer rate 124 from the entries selected on the basis of the allowed transfer rate. Such selection of the networks used for the inter-switch communications (selection of the inter-switch route view) are performed for every destination switch registered in the destination switch list. As a result, the networks 300 used for communications from the switch 200 which transmits the load balancing information 230 to a different switch 200 is identified for every destination switch.

The network management section 110 configures the networks 300 specified in the entries selected through the above-described process as networks to be used between the source switches and destination switches specified in the selected entries. In detail, the source switch identifiers and destination switch identifiers of the selected entries are registered as the source switch identifiers 131 and destination switch identifiers 132 of the network flow table 130 and the network identifiers of the selected entries are registered in the network identifier lists 133 associated with these source switch identifiers 131 and destination switch identifiers 132. Such registration into the network flow table 130 is performed for every destination switch registered in the destination switch list. As a result, the networks 300 used for communications from the switch 200 which transmits the load balancing information 230 to a different switch 200 are registered into the network flow table 130 for every destination switch.

It is possible to register into the network flow table 130 networks 300 to be used between every combination of all the switches 200 which can communicate with the controller 100, by performing the processes of steps S503, S504, S505, S506 and S507 for all the entries of the network information table 120.

The network management section 110 updates the flow table 240 of each switch 200 on the basis of the updated network flow table 130 (step S508). The network management section 110 transmits to the switch management section 210 a flow table to be updated. In this operation, the destination switch identifiers 132 and network identifier lists 133 associated with a source switch identifier 131 are transmitted to the switch 200 identified by the switch identifier identical to the source switch identifier 131. The switch management section 210 configures or updates the destination switch identifiers 132 and network identifier lists 133 transmitted thereto as the destination switch identifiers 243 and network identifier lists 244 onto its own flow table 240.

When a communication to a different switch 200 is required, the switch management section 210 refers to the flow table 240 and performs the communication by using the networks described in the network identifier list 244 of the entry in which the destination switch identifier 243 matches the switch identifier of the different switch 200. When the network identifier list 244 includes a plurality of communication routes, communications are performed by using a conventional technique, such as link aggregation. No specific communication method is described, because the specific communication method is not related to the scope of the present invention.

Next, the network determination operation at steps S505 to S508 is described using a specific example. Here, a description is given of the operation to determine the flow to be configured onto the switch 200-1 on the basis of the load balancing information 230 transmitted from the switch 200-1, in the system illustrated in FIG. 7.

When receiving the load balancing information 230 illustrated in FIG. 17 and the switch identifier "SWITCH x" from the switch 200-1, the network management section 110 extracts entries in which the source switch identifier 121 is "SWITCH x" as a source switch view associated with "SWITCH x" from the network information table 120. Illustrated in FIG. 18 is one example of the extracted source switch view.

The network management section 110 generates a destination switch list in which all of the destination switch identifiers listed in the source switch view are stored. Referring to FIG. 18, since only "SWITCH y" is described as the destination switch identifier 122 in the source switch view, only one destination switch identifier "SWITCH y" is registered in the destination switch list.

The network management section 110 extracts entries in which the destination switch identifier 122 is the switch identifier "SWITCH y", from the generated source switch view. Here, all the entries satisfies this requirement and the source switch view illustrated in FIG. 18 is determined in entirety as an inter-switch route view in which the switch 200-1 ("SWITCH x") is defined as the source and the switch 200-2("SWITCH y") is defined as the destination".

The network management section 110 then extracts the maximum transfer rate and calculates the allowed transfer rate. Here, the maximum transfer rate for the destination switch 200-2 is extracted as 1000 MB/sec from the inter-switch route view illustrated in FIG. 18. Additionally, the allowed transfer rate is determined as 600 MB/sec, since the transfer threshold 233 is described as 60% in the load balancing information 230 illustrated in FIG. 17.

The network management section 110 performs selection of networks to be used. Here, entries in which the transfer rate 124 is less than the allowed transfer rate "600 MB/sec" are excluded from the inter-switch route view illustrated in FIG. 18. As a result, the entries which include "NETWORK 3" and "NETWORK 4" are excluded from candidates of networks to be used.

Next, the network management section 110 checks the number of the remaining entries of the inter-switch route view. The number of the entries is two and the maximum network number 232 is "2" as understood from the load balancing information 230 illustrated in FIG. 13. This implies that the number of the entries is sufficiently reduced and the selection process is completed. Illustrated in FIG. 19 is the inter-switch route view after the selection by this process.

Figure 19:
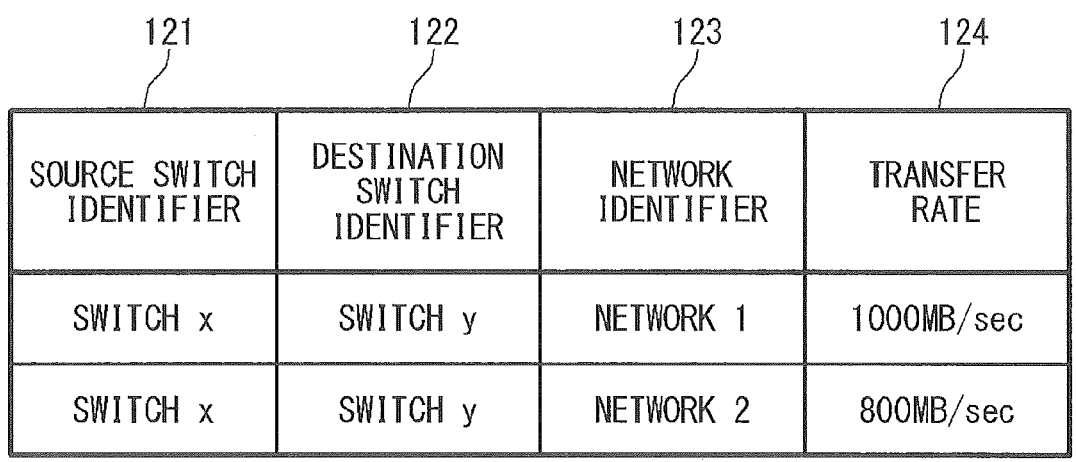
FIG. 19 is a diagram illustrating still another example of the network information table according to the present invention.

The network management section 110 generates an available network list including all of the network identifiers 123 "NETWORK 1" and "NETWORK 2" described in the inter-switch route view which is reduced as illustrated in FIG. 19.

The network management section 110 updates the network flow table 130 on the basis of the available network list. Illustrated in FIG. 20 is the updated network flow table 130. Since the destination switch list associated with the switch 200-1 consists of only one element "SWITCH y", the above-described process is not performed for other destination switches and the network flow table 130 illustrated in FIG. 20 is transmitted to the switch 200-1 as an update flow table. The switch management section 210 of the switch 200-1 replaces its own flow table 240 with the transmitted update flow table. As a result, the flow table 240 (the actions 242 of the flow table 240) of the switch 200-1 is rewritten as illustrated in FIG. 21. After that, the switch 200-1 uses only the networks 300-1 and 300-2, which have a transfer rate higher than the allowed rate of 600 MB/sec, when performing packet transfer to the switch 200-2.

In the computer system according to the present invention, the network load status collected by the switches 200 are aggregated by the controller 100, and the flow control of the switches 200 (the determination of networks to be used) is performed by the controller 100 on the basis of the result of the aggregation. Accordingly, the present invention allows automatically determining networks to be used for communications in accordance with the load balancing policy in the system incorporating communication networks (e.g. a storage system).

Also, the controller 100 according to the present invention, which keeps track of the load status on the basis of the communication transfer rates measured by the switches 200, can make a decision on the load status even when a plurality of switches 200 shares a band of a network.

Furthermore, the controller 100 according to the present invention updates the network flow table at predetermined time intervals. This allows automatically switching to appropriate routes (routes under superior communication conditions) even when a failure or a reduction of the communication rate occurs in a network. In the computer system according to the present invention, the controller 100 can keep track of the structure status even when the structure is dynamically modified, for example, when a switch 200 is added, moved or removed. The controller 100 periodically obtains the transfer performances in respective communication routes after the structure modification, allowing a flow control with optimized routes. Accordingly, inter-switch communications can be achieved by using optimized communication routes even when a failure occurs in a network.

Furthermore, statistic information such as the transfer rates is obtained for all the communications in the networks, and it is therefore possible to use an optimized communication route even in the case that various I/O's exist on the same network, such as FCoE.

Figure 22:
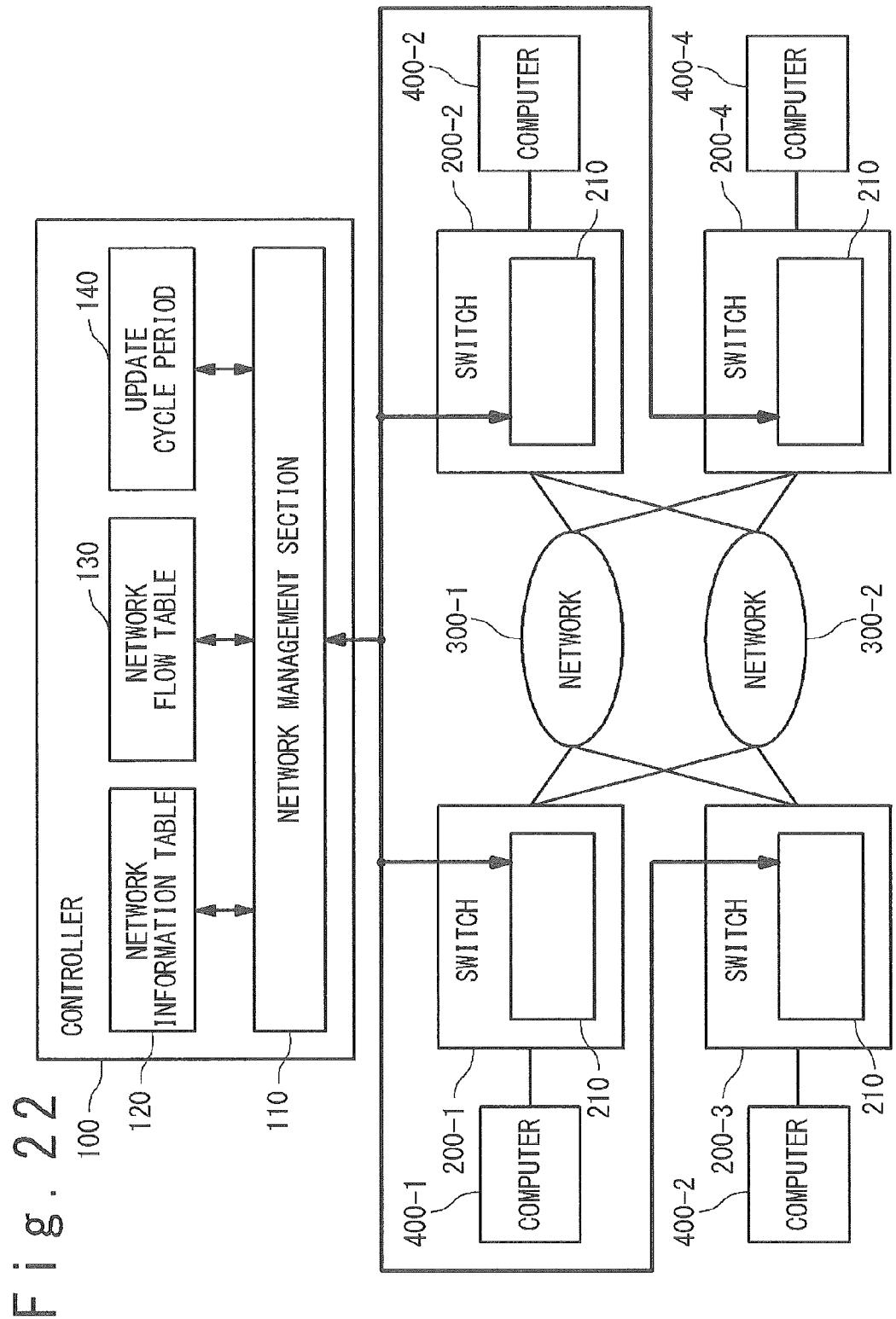
FIG. 22 is a diagram illustrating still another example of the structure of a computer system in the exemplary embodiment according to the present invention.

Although exemplary embodiments of the present invention are thus described in detail, specific structures are not limited to the above-described exemplary embodiments; the present invention encompasses modifications which do not depart from the scope of the present invention. Although two switches 200 are included in the system examples illustrated in FIGS. 1 and 7, implementations are not limited to such structure and extendable to the case that the number of switches may be any number equal to or larger than three. Illustrated in FIG. 22 is an exemplary system including four switches 200-1 to 200-4. In the example illustrated in FIG. 22, two networks 300-1 and 300-2 are connected between respective combinations of four switches 200-1 to 200-4. Additionally, computers 400-1 to 400-4 are connected to the switches 200-1 to 200-4, respectively. In such system, an operation similar to that in the above-described exemplary embodiments achieves inter-computer communications using optimum networks.

It should be noted that the present application is based on Japanese patent application No. 2012-003551 and the disclosure in Japanese patent application No. 2012-003551 is incorporated herein by reference.

The invention claimed is:

1. A computer system, comprising:
a controller; and
a switch which is connected to a different switch via a plurality of networks and performs relaying of received packets in accordance with flow entries configured by said controller,
wherein said switch transfers test data to said different switch via each of said plurality of networks to obtain a transfer performance of each of said plurality of networks and notifies said controller of said transfer performance so that said transfer performance is correlated with each of said plurality of networks,
wherein said controller configures a flow entry onto a flow table of said switch, the flow entry specifying a network with a transfer performance equal to or higher than a threshold value out of said plurality of networks as a transfer route to the different switch, wherein said controller calculates an allowed transfer rate based on the transfer performance notified from said switch and configures a network(s) which has a transfer performance equal to or higher than said allowed transfer rate as a network(s) to be used by said switch, and
wherein said controller selects the network(s) to be used by said switch from higher ranked networks in terms of the transfer performance out of networks having a transfer performance equal to or higher than said allowed transfer rate, so that the number of the selected network(s) is equal to or less than an allowed maximum number of networks available to said switch.

2. The computer system according to claim 1, wherein said switch performs the obtainment and notification of said transfer performance in response to an obtainment instruction of said transfer performance periodically issued by said controller.

3. The computer system according to claim 1, wherein said controller periodically performs configuration of the flow entry based on said transfer performance onto said switch.

4. The computer system according to claim 1, wherein the switch determines a processing method to be performed for received packets on the basis of the flow table which is configured by the controller, in accordance with an OpenFlow protocol.

* * * * *